US010827776B2

(12) United States Patent
Kim

(10) Patent No.: US 10,827,776 B2
(45) Date of Patent: Nov. 10, 2020

(54) HIGH-CAPACITY JUICE EXTRACTOR

(71) Applicant: Chom Tu I Kim, Busan (KR)

(72) Inventor: Chom Tu I Kim, Busan (KR)

(*) Notice: Subject to any disclaimer, the term of this patent is extended or adjusted under 35 U.S.C. 154(b) by 195 days.

(21) Appl. No.: 16/065,111

(22) PCT Filed: Dec. 19, 2016

(86) PCT No.: PCT/KR2016/014898
§ 371 (c)(1),
(2) Date: Jun. 21, 2018

(87) PCT Pub. No.: WO2017/116056
PCT Pub. Date: Jul. 6, 2017

(65) Prior Publication Data
US 2019/0000258 A1 Jan. 3, 2019

(30) Foreign Application Priority Data
Dec. 31, 2015 (KR) ........................ 10-2015-0191176

(51) Int. Cl.
*A23N 1/00* (2006.01)
*B30B 3/06* (2006.01)
*A47J 19/06* (2006.01)

(52) U.S. Cl.
CPC ............... *A23N 1/00* (2013.01); *A23N 1/003* (2013.01); *A47J 19/06* (2013.01); *B30B 3/06* (2013.01)

(58) Field of Classification Search
CPC .......... A47J 19/06; A47J 19/025; A47J 19/02; A47J 43/04; A23N 1/02; A23N 1/003;
(Continued)

(56) References Cited

U.S. PATENT DOCUMENTS 5,031,522 A * 7/1991 Brixel ........................ A23L 2/04
210/360.1
5,628,247 A * 5/1997 Palumbo ................ B30B 9/207
99/509
(Continued)

FOREIGN PATENT DOCUMENTS

EP 0728423 A1 8/1996
JP 2013-078288 A 5/2013
(Continued)

OTHER PUBLICATIONS

International Search Report for PCT/KR2016/014898 dated Apr. 7, 2017 from Korean Intellectual Property Office.

*Primary Examiner* — Reginald Alexander
(74) *Attorney, Agent, or Firm* — Revolution IP, PLLC

(57) ABSTRACT

A high-capacity juice extractor includes: a base; first and second supports which are spaced apart from each other in a longitudinal direction, and are provided on the base; a first extracting member which is a hollow cylinder opened toward the second support, is positioned between the first support and the second support, is rotatably supported on the first support by an outer casing support shaft, and is formed with a plurality of outlet ports; a second extracting member which is rotatably supported on the second support by an inner casing support shaft which is eccentric to the outer casing support shaft, and is positioned in the first extracting member to be eccentric to the first extracting member; and a driving member configured to drive at least one of the first extracting member and the second extracting member.

13 Claims, 17 Drawing Sheets

173 183 189 177 187 170 151 1455 155 189 S 1453 120 157 133 161 161 110

(58) Field of Classification Search

CPC .. A23N 1/00; B30B 3/06; B30B 3/005; B30B 3/04; B02C 19/22

USPC .................... 99/503, 513, 510, 509; 100/157

See application file for complete search history.

(56) References Cited

U.S. PATENT DOCUMENTS

| | | | | |
|---|---|---|---|---|
| 8,783,171 | B2 * | 7/2014 | Lin | A47J 19/02 100/130 |
| 2009/0301318 | A1 * | 12/2009 | Torrisi | A23N 1/003 99/503 |
| 2014/0352558 | A1 * | 12/2014 | Wong | A23N 1/02 100/98 R |
| 2016/0129655 | A1 * | 5/2016 | Wouters | B65B 69/005 100/102 |

FOREIGN PATENT DOCUMENTS

| | | | |
|---|---|---|---|
| KR | 20-0135675 | Y1 | 2/1999 |
| KR | 10-0209320 | B1 | 7/1999 |
| WO | 2012-086861 | A1 | 6/2012 |

* cited by examiner

[FIG. 1]
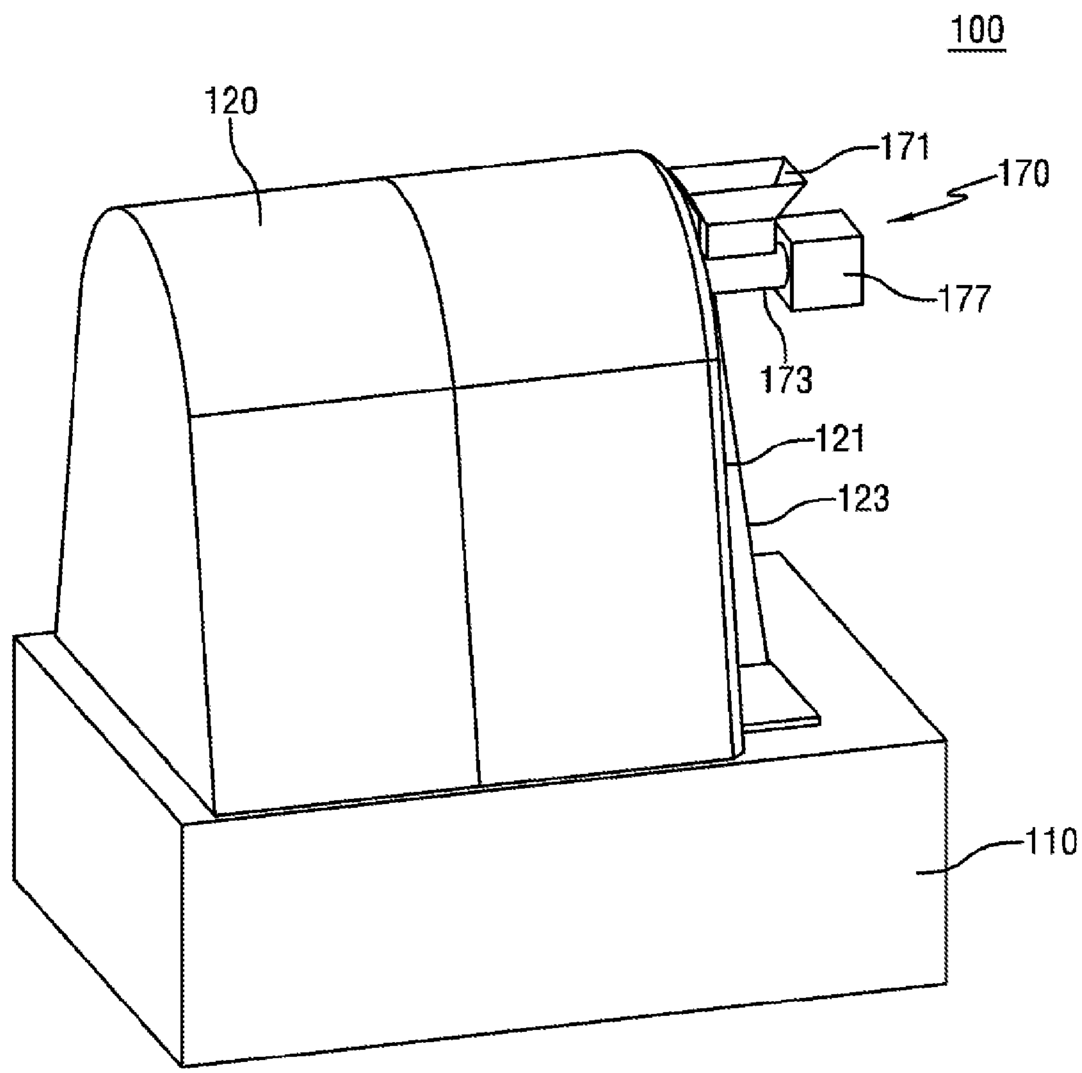

[FIG. 2]
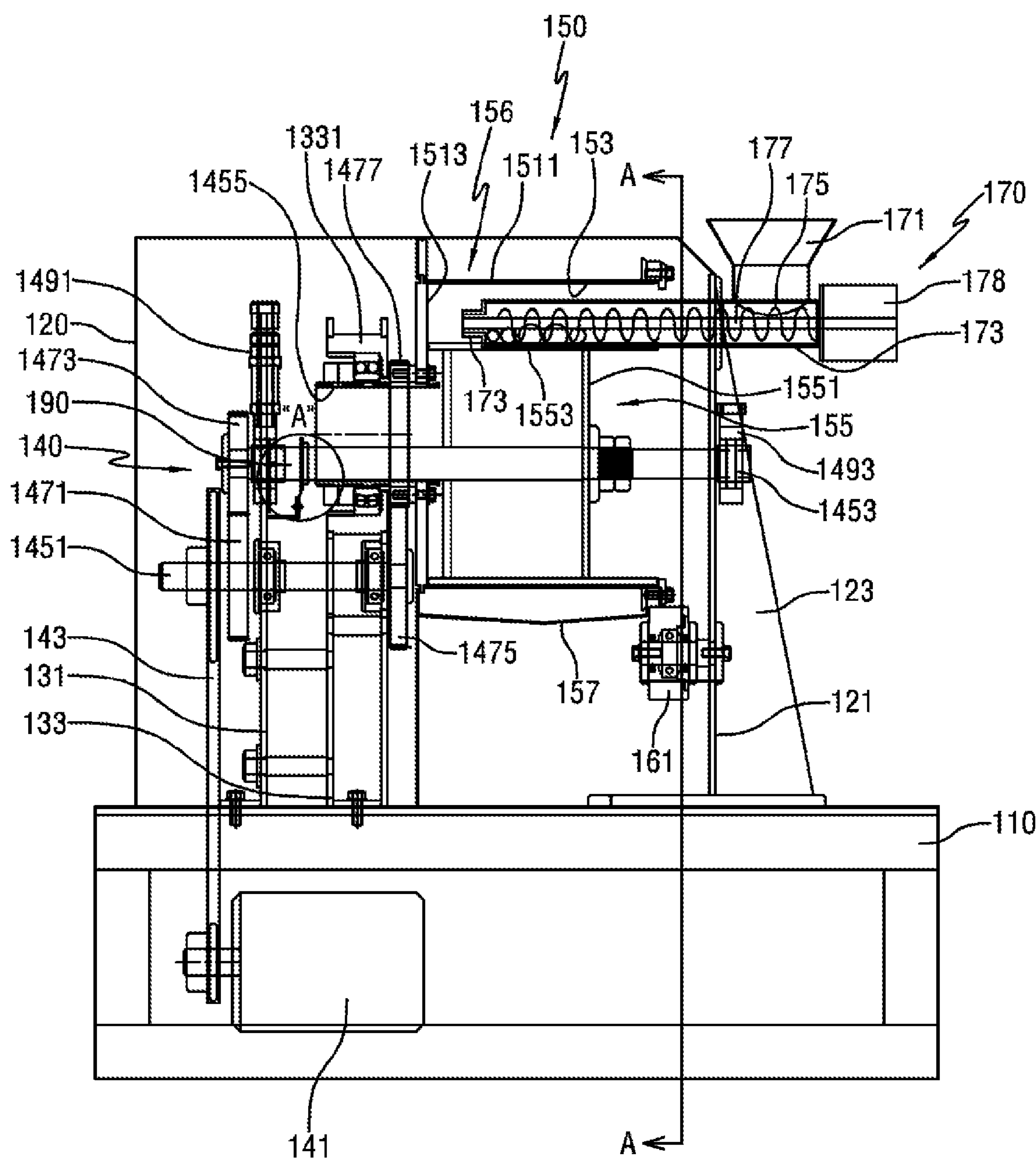

[FIG. 3]
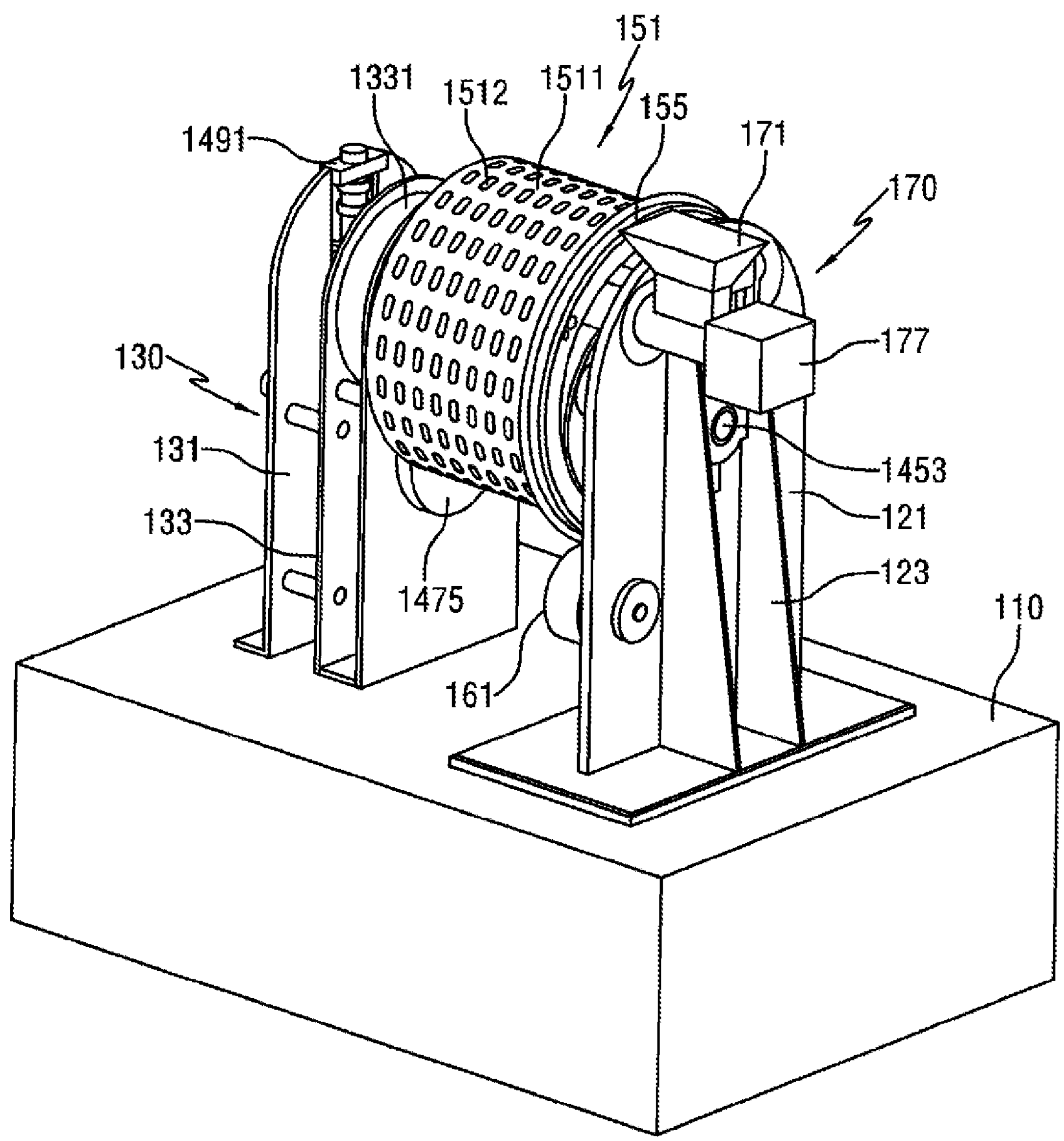

[FIG. 4]
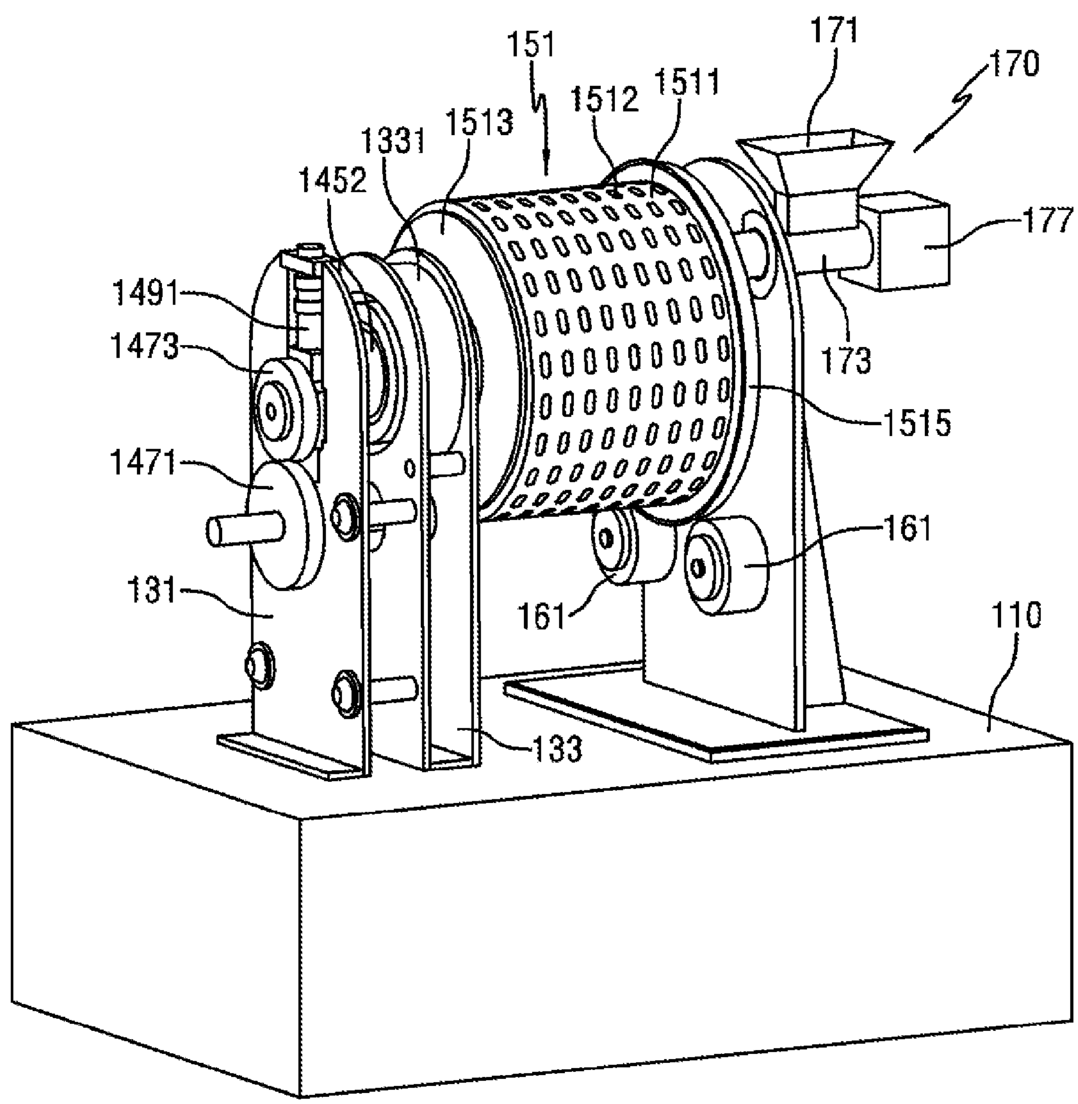

[FIG. 5]
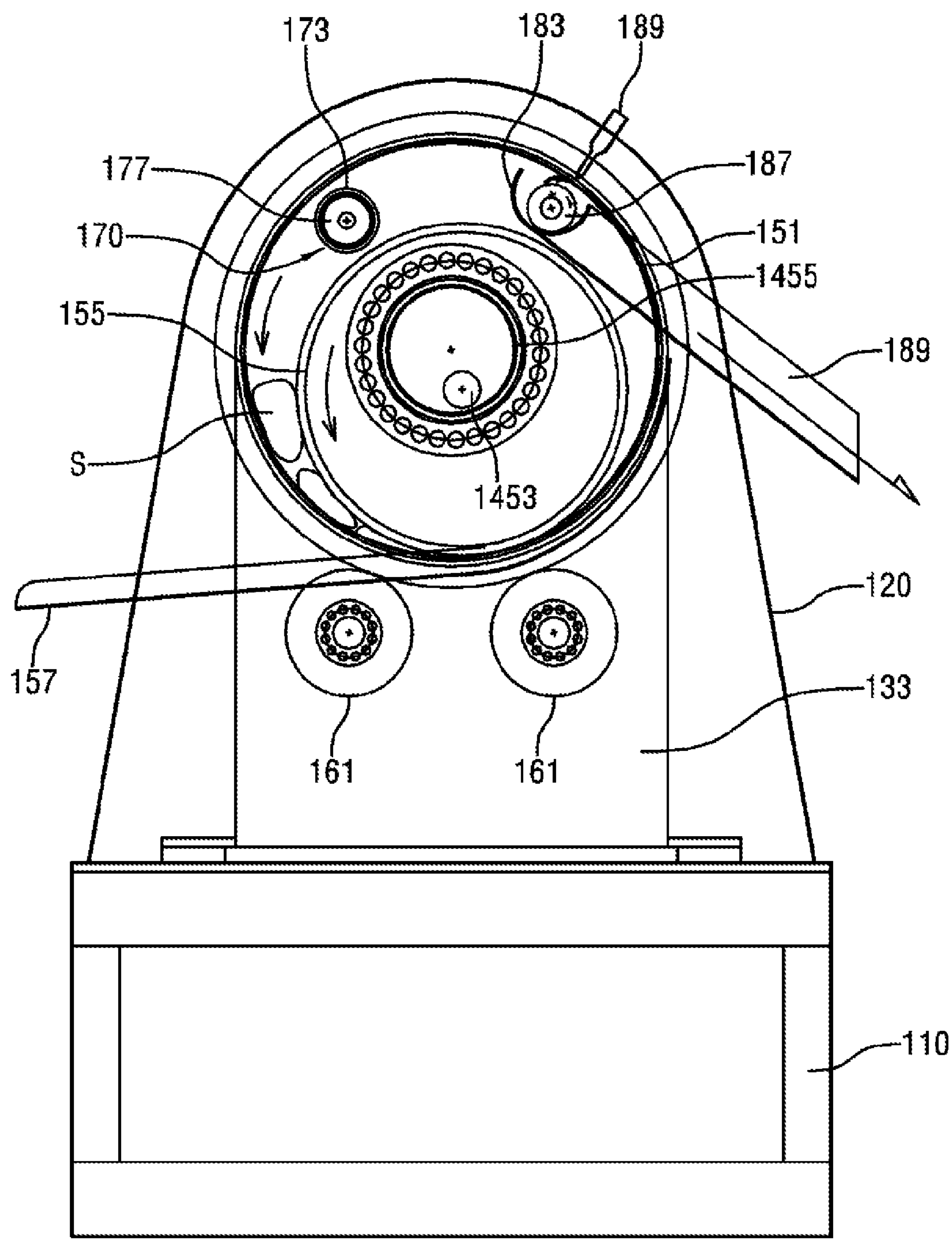

[FIG. 6]
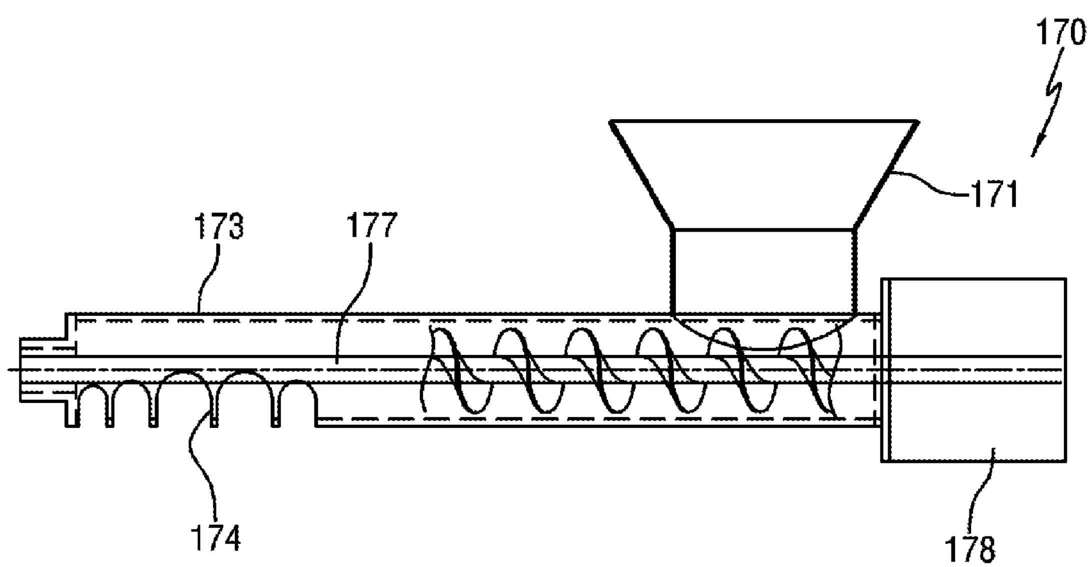

[FIG. 7]
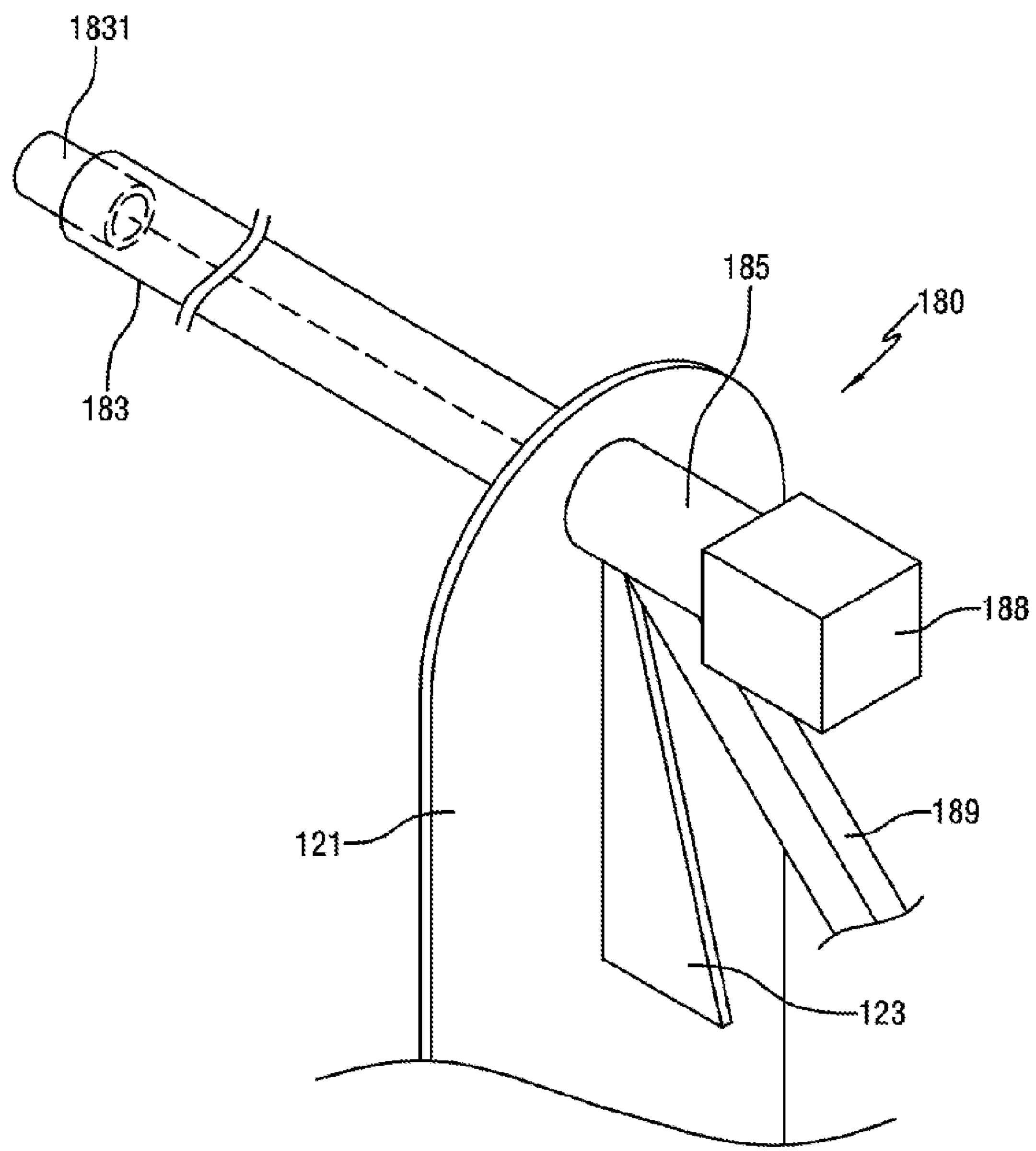

[FIG. 8]
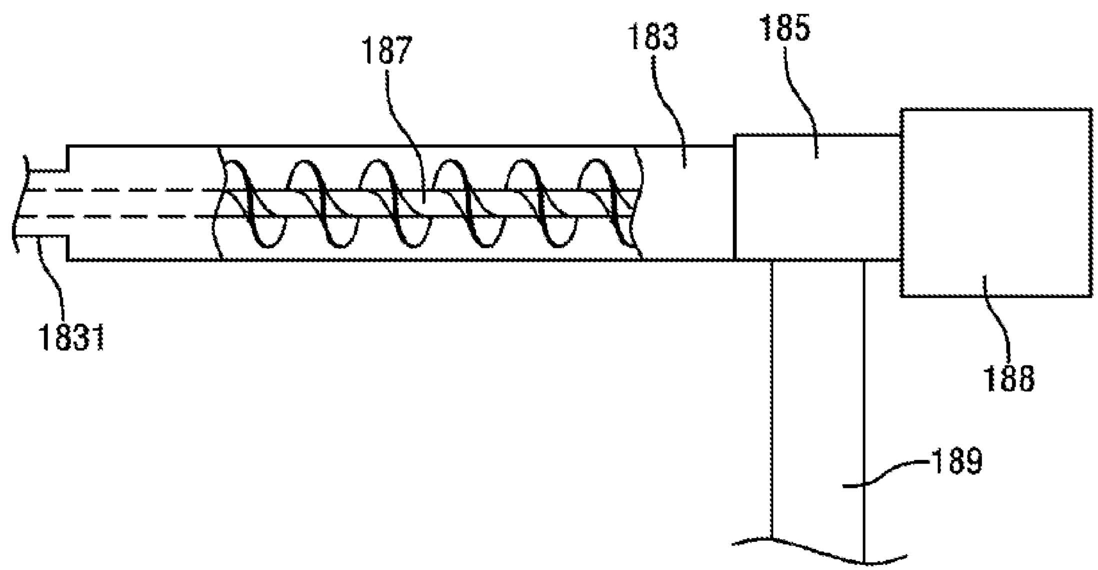

[FIG. 9]
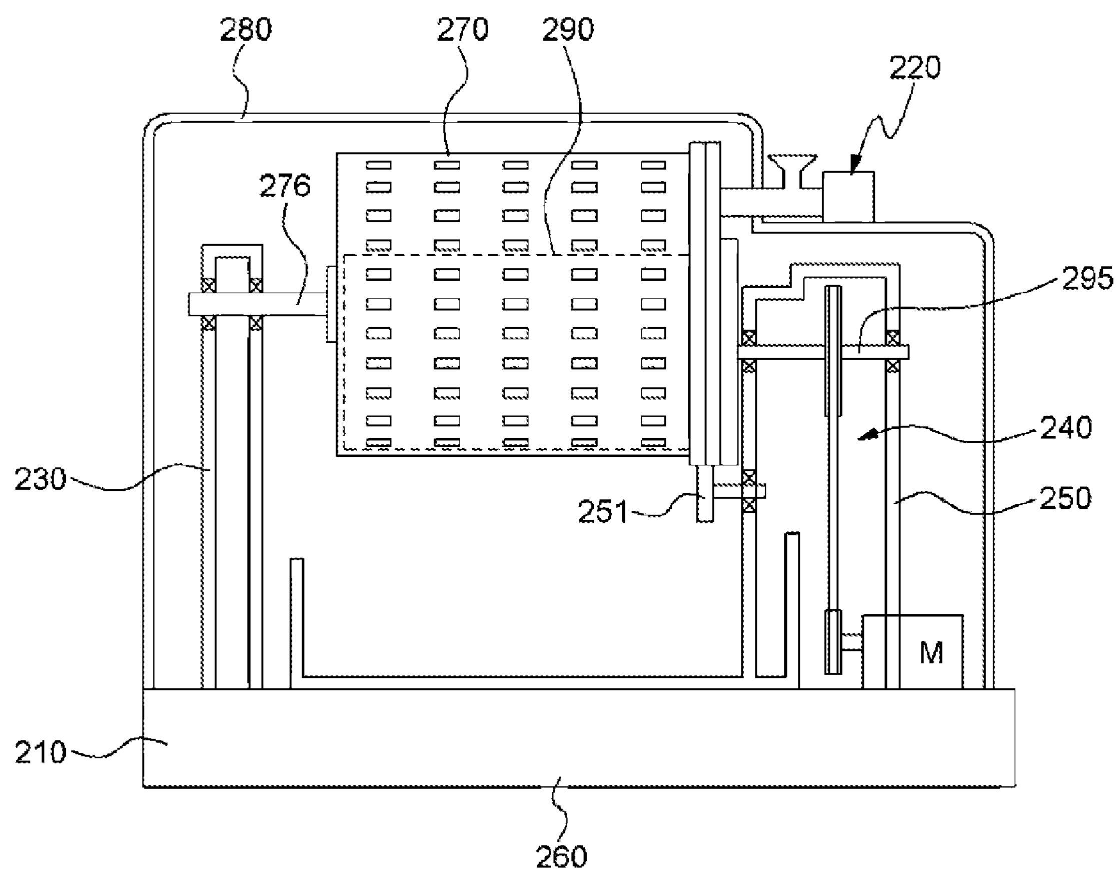

[FIG. 10]
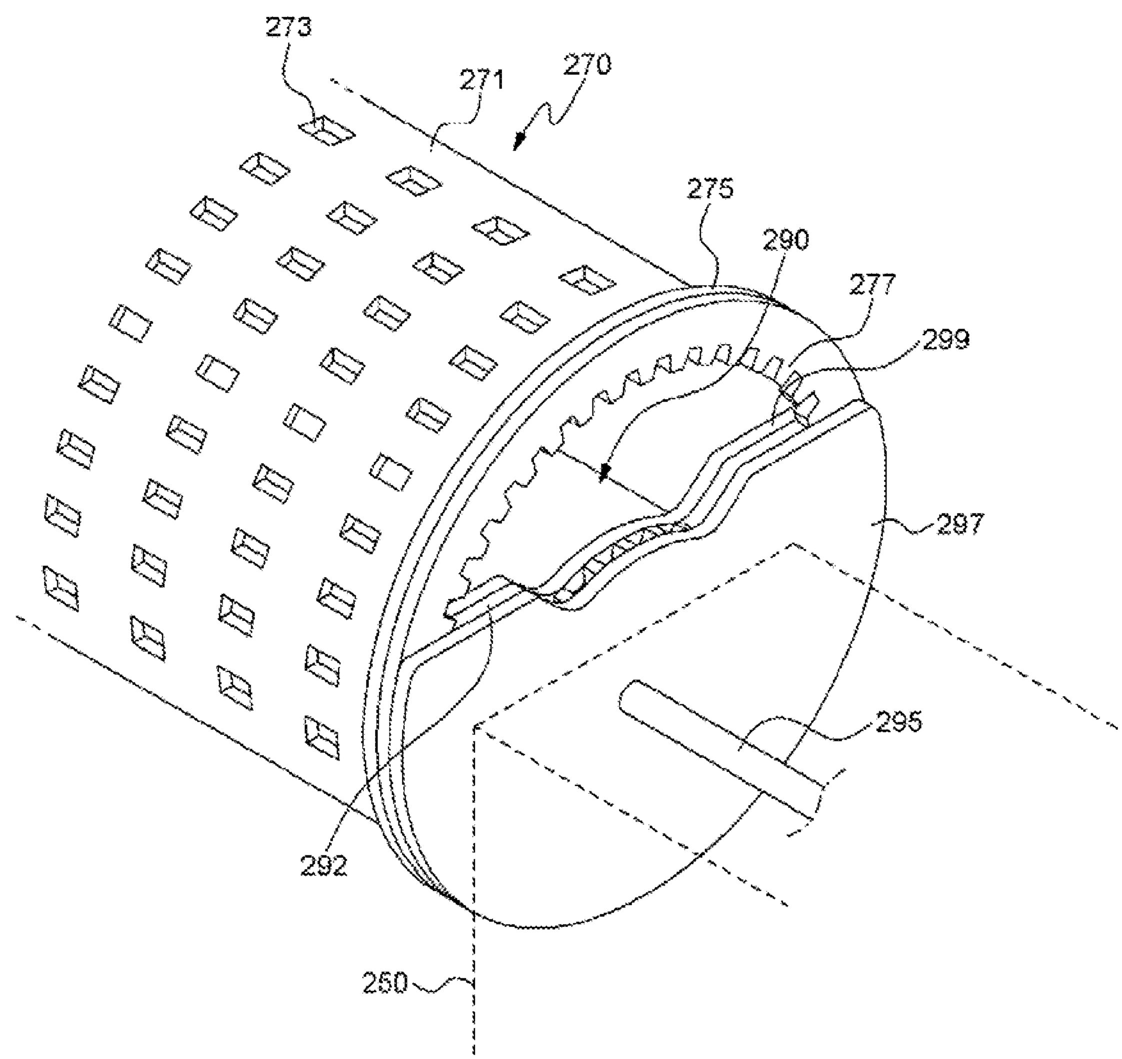

[FIG. 11]
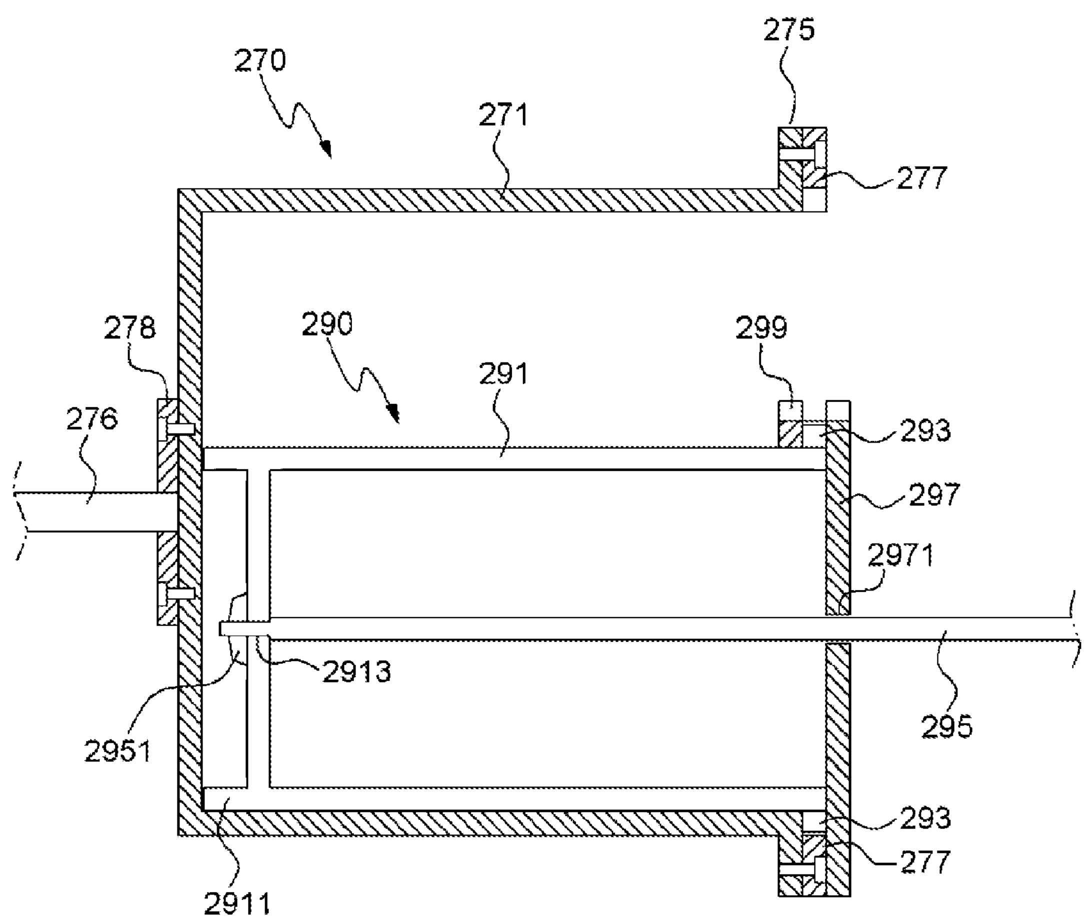

[FIG. 12]
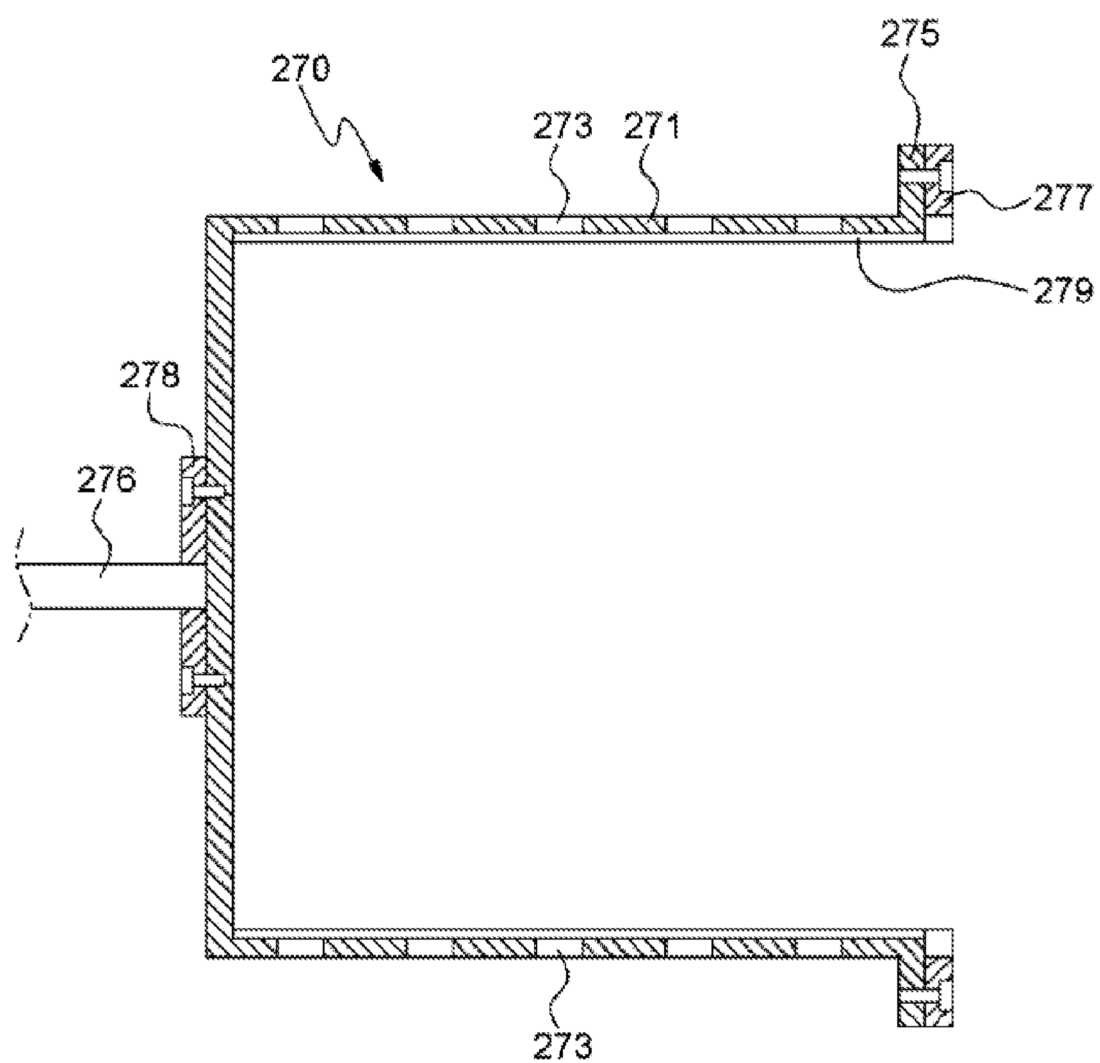

[FIG. 13]
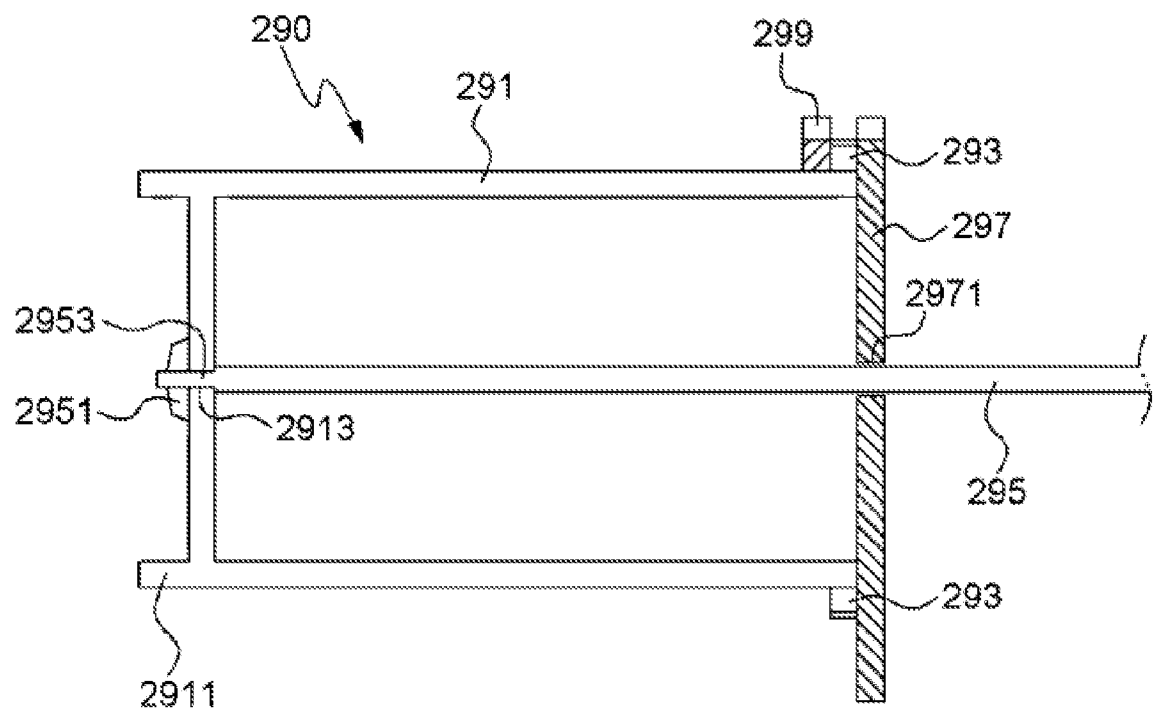

[FIG. 14]
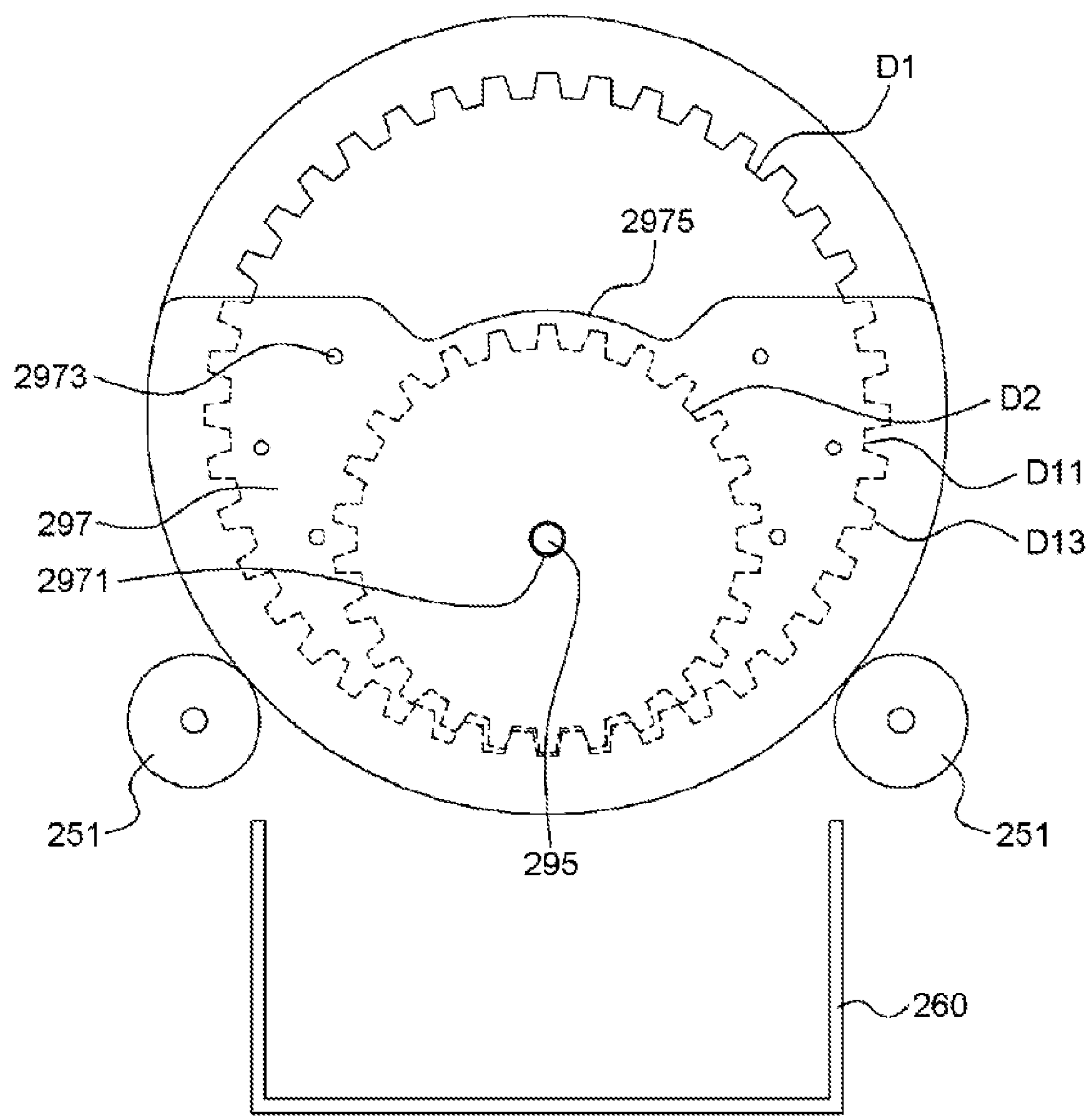

[FIG. 15]
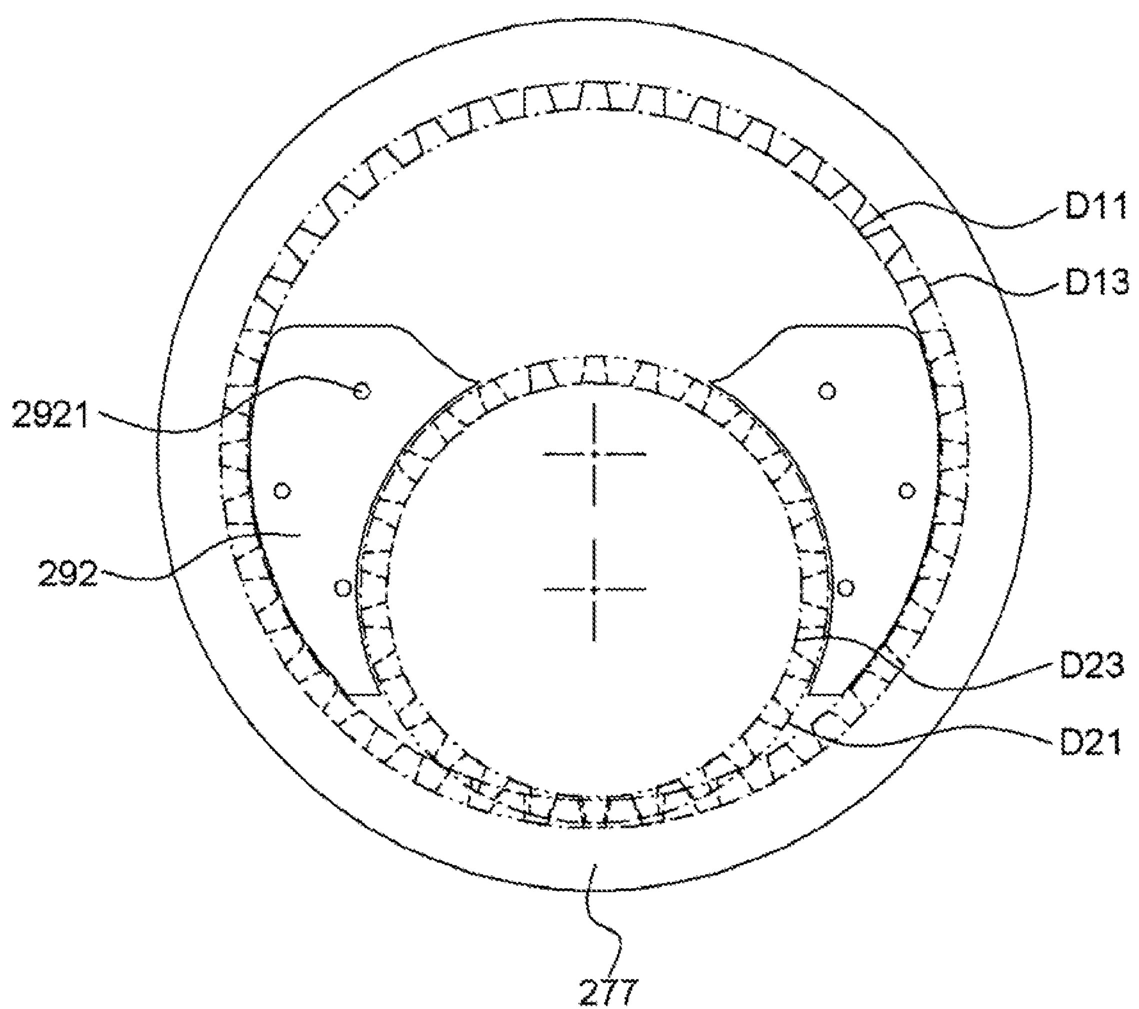

[FIG. 16]
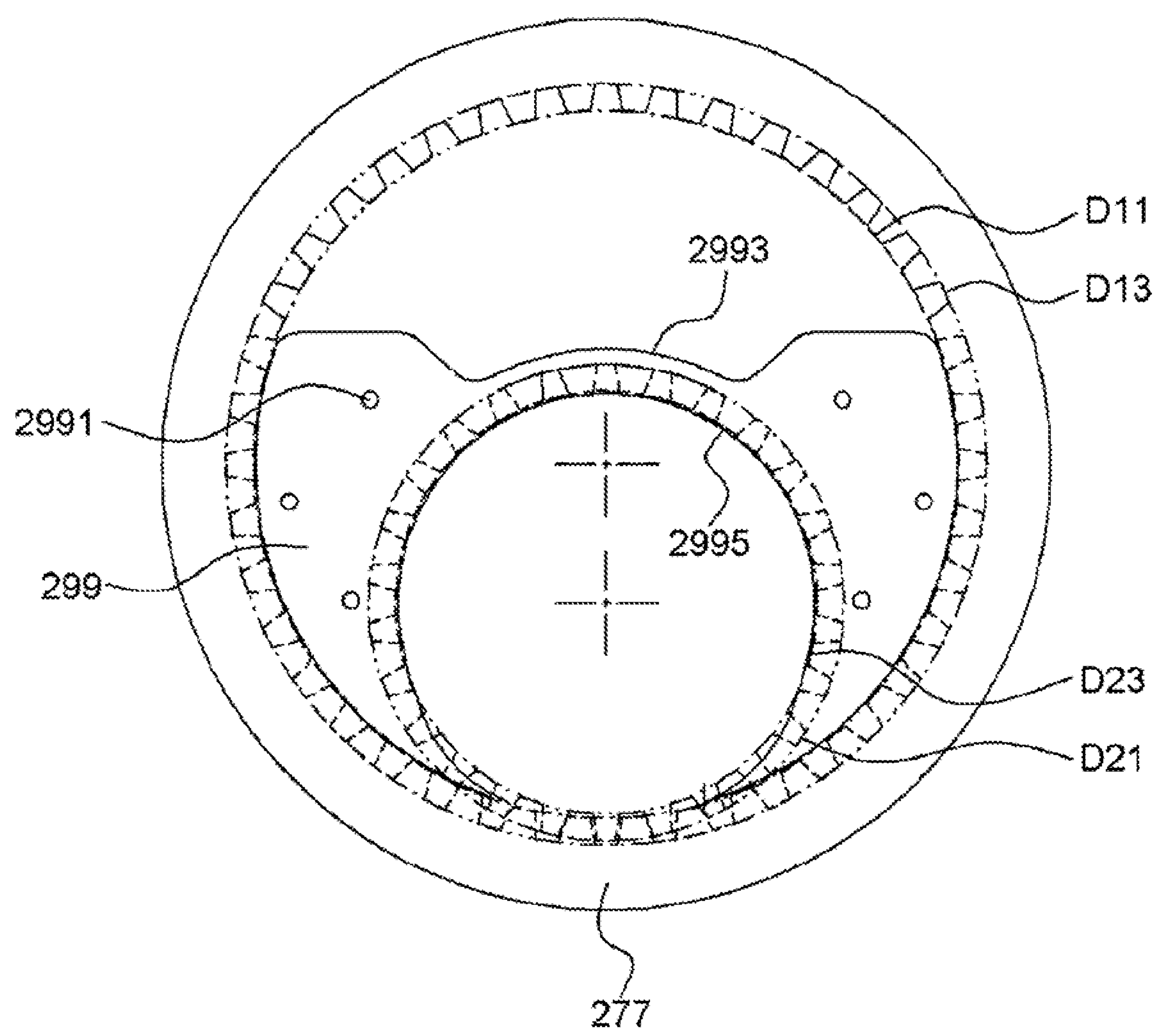

[FIG. 17]
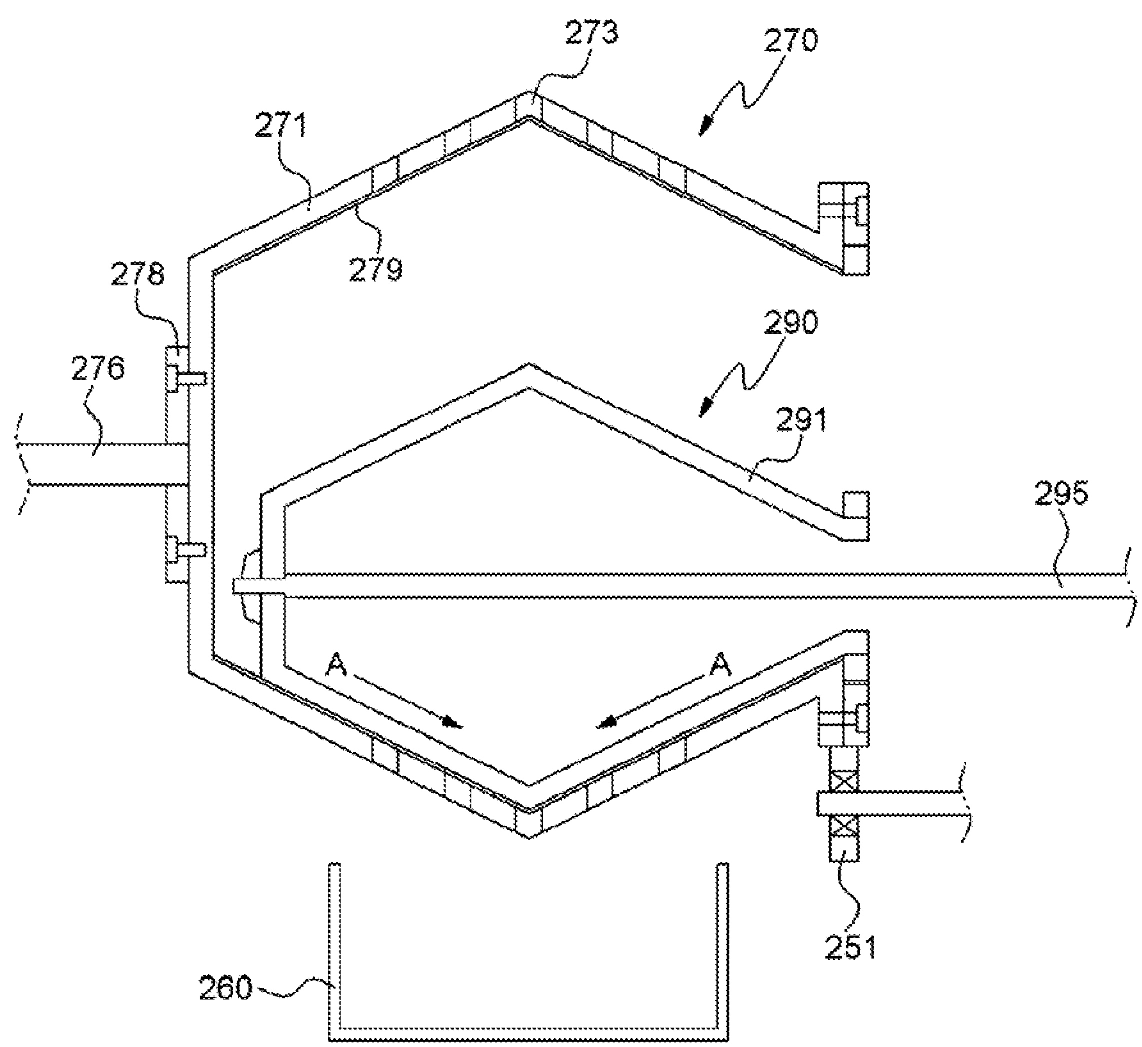

HIGH-CAPACITY JUICE EXTRACTOR

TECHNICAL FIELD

The present invention relates to a high-capacity juice extractor, and more particularly, to a high-capacity juice extractor of a simple structure that can easily adjust a gear ratio to control circumferential speeds of a first extractor and a second extractor, and prevent juice from leaking.

BACKGROUND ART

In general, a juice extractor is a kind of juicers capable of extracting a juice from various materials (hereinafter referred to as an "object to be extracted"), such as vegetables or fruits, by crushing, grindings and/or squeezing the materials.

As illustrated in FIGS. 1 to 8, a juice extractor 100 according to the related art includes a base 110 serving as a support, a support member 130 fixed on the base 110, a extracting unit 150 rotatably installed to the support member 130, a feeding unit 170 supplying an object to be extracted into the extracting unit 150, a discharge unit 180 discharging pulp from the extracting unit 150, and a driving unit 140 rotating the extracting unit 150. Also, the juice extractor includes a cover 120 for housing parts of the above components therein.

As illustrated in FIGS. 2 and 5, the extracting unit 150 has a first extractor 151 and a second extractor 155 disposed in the first extractor 151, in which the first extractor 151 is connected to and rotated by a third shaft 1455, and the second extractor 155 is connected to and rotated by a second shaft 1453. A rotary shaft of a first extractor 150, i.e., a third shaft 1455, and a rotary shaft of a second extractor 155, i.e., a second shaft 1453, are eccentrically installed.

The support member 130 has a first support 131, a second support 133 and a third support 121 which are provided on the base 110 and are spaced apart from each other in a longitudinal direction. The first support 131 and the third support 121 are provided at both sides of the second support 133 in the longitudinal direction. The third support 121 may serve as a cover for covering an opening formed at one side of the cover 120. The support member 130 may further have at least one reinforcing support 123 for reinforcing and supporting the third support 121, with the reinforcing support being fixed to the base at a lower end thereof and being connected to the third support 121 at a side thereof.

The support member 130 supports the first shaft 1451, the second shaft 1453 and the third shaft 1455 in a rotatable manner, with bearings being interposed between the support member and the respective shafts.

The first extractor 151 has a first cylindrical portion 1511 and a first annular portion 1513 connected to the first cylindrical portion 1511 to support the first cylindrical portion in a radial direction. The first annular portion 1513 is connected to the third shaft 1455 rotatably connected to the second support 133, with the bearing being interposed therebetween. The third shaft 1455 may be inserted in and connected to an inside of the first annular portion 1513. The third shaft 1455 is connected to the first annular portion 1513 and is extended in a direction opposite to the first cylindrical portion 1511. The first extractor 151 is supported in the radial direction since one side of the first annular portion 1513 is connected to the third shaft 1455 along the longitudinal direction. The other side of the first cylindrical portion 1511 of the first extractor 151 is supported in the radial direction by at least one support roller 161 which is rotatably installed to the third support 121. The support roller 161 protrudes from the third support 121 towards the first cylindrical portion 1511 to support the first cylindrical portion 1511 in a rotatable manner. The other side of the first cylindrical portion 1511 is provided with a support ring 1515 at one end thereof, and the support ring 1515 is brought into contact with the support roller 161 in a rotatable manner to support the first cylindrical portion 1511. As illustrated in FIG. 5, the support roller 161 is installed to the third support 121 so that the support roller is brought into contact with an outer peripheral surface of a lower portion of the cylindrical portion 1511. The third shaft 1455 has a hollow body, and the third extractor 151 is a structure of an opened right side which is seen in a longitudinal direction.

The rotational shaft, i.e., the second shaft 1453, of the second extractor 155 is rotatably supported by the first support 131 at one side, with the bearing being interposed therebetween, and the other side is rotatably supported by the third support 121, with the bearing being interposed therebetween. The third shaft 1453 penetrates the inside of the third hollow shaft 1455, and, as illustrated in FIGS. 2 and 5, is installed in such a way that a center of the third shaft is deviated from that of the third shaft 1455 connected to the first extractor 151.

The second shaft 1453 is provided with the second extractor 155 in such a way that the second shaft and the second extractor are rotated together. The second extractor 155 is positioned in the first extractor 151. The second extractor 155 has a second cylindrical portion 1553 and a plurality of second annular portions 1551 which are spaced apart from the second cylindrical portion in the longitudinal direction and are connected to the second cylindrical portion 1553 at its outer peripheral surfaces. The second shaft 1453 is connected to the second annular portion 1551 in such a way that the second shaft is rotated together with the second annular portion.

The second extractor 155 is positioned in the first extractor 151. A center of rotation of the first cylindrical portion 1511 is eccentric to that of the second cylindrical portion 1553, so that the center of rotation is different from each other. As illustrated in FIG. 5, the first cylindrical portion 1511 and the second cylindrical portion 1553 are installed by making their centers of rotation different in such a way that an upper gap between the first cylindrical portion 1511 and the second cylindrical portion 1553 is bigger than a lower gap between the first cylindrical portion 1511 and the second cylindrical portion 1553. In FIG. 5 a reference numeral **1455*a* indicates the center of rotation of the first extractor 151, and 1453*a* indicates the center of rotation of the second extractor 155. As illustrated in FIG. 5, the center of rotation of the second cylindrical portion 1553 is disposed downwardly relative to the center of rotation of the first cylindrical portion 1511**.

An object to be extracted S is introduced into the big gap between the first cylindrical portion 1511 and the second cylindrical portion 1553, and the introduced object is downwardly guided to the small gap by the gravity and the first cylindrical portion 1511 and the second cylindrical portion 1553 which are rotated in the direction indicated by the arrow in FIG. 5, so that the object to be extracted is squeezed between the inner peripheral surface of the first cylindrical portion 1511 and the outer peripheral surface of the second cylindrical portion 1553.

The driving unit 140 has an electric motor 141, a first gear 1471 and a third gear 1475 which are engaged to the first shaft 1451, a second gear 1473 engaged to the second shaft 1453, and a four gear 1477 engaged to the first shaft 1455.

The electric motor 141 is installed on the base 110, and the first shaft 1453 and the third shaft 1455 are driven by the electric motor 141. A pulley is mounted on a shaft of the electric motor 141, and a pulley is mounted on a left end of the first shaft 1451 when seen in the longitudinal direction. Both pulleys are connected to each other by a belt 143, so that the rotation of the electric motor 141 is transmitted to the first shaft 1451.

The first gear 1471 is installed on the first shaft 1451 at the side of the pulley, and the second gear 1473 which is meshed with the first gear 1471 is installed on the portion of the second shaft 1453 which protrudes from the third shaft 1455 towards the left side in the longitudinal direction. The third gear 1475 is installed on the right end of the first shaft 1451 in the longitudinal direction, and the fourth gear 1477 which is meshed with the third gear 1475 is installed on the third shaft 1455.

When the electric motor 141 operates, the shaft 1451 is rotated by the belt 143 and the pulley, the second shaft 1453 is rotated by the connection of the first gear 1471 and the second gear 1473, and the third shaft 1455 is rotated by the connection of the third gear 1475 and the fourth gear 1477. Thus, the second extractor 155 connected to the second shaft 1453 and the first extractor 151 connected to the third shaft 1455 are rotated. The first extractor 151 and the second extractor 155 are rotated in the direction indicated by the arrow in FIG. 5, and a gear ratio of the first gear 1471, the second gear 1473, the third gear 1475 and the fourth gear 1477 is adjusted to make their circumferential speeds equal.

As illustrated in FIGS. 2 to 5, the feeding unit 170 is provided to introduce the object to be extracted between the first cylindrical portion 1511 of the first extractor 151 and the second cylindrical portion 1553 of the second extractor 155. The discharge unit 180 is provided to discharge the pulp existing between the first cylindrical portion 1551 and the second cylindrical portion 1553 after extraction. The feeding unit 170 and the discharge unit 180 are installed on the upper portion which corresponds to a wide gap between the first cylindrical portion 1511 and the second cylindrical portion 1553.

The feeding unit 170 has a hollow feeding housing 173, a screw conveyer 177 rotatably installed in the feeding housing 173, and a hollow feeding hopper 171 extending from the feeding housing 173, which is exposed outwardly in a longitudinal direction of the first cylindrical portion 1511, towards an inside of the feeding housing 173, a diameter of the feeding hopper being increased toward an upper portion. The feeding hopper 171 extends upwardly from the feeding housing 173. The feeding unit 170 is preferably installed to be offset to a rotation direction of the first extractor 151 and the second extractor 155.

A portion of the feeding housing 173 is positioned between an inner surface of the first cylindrical portion 1511 and an outer surface of the second cylindrical portion 1553, and the other portion is exposed outwardly from the first cylindrical portion 1511 of the first extractor 151 along the longitudinal direction thereof. The feeding housing 173 is fixed to the third support 121, with a portion of the feeding housing being positioned at a left side of the third support 121 in the longitudinal direction, while the other portion being positioned at a right side of the third support 121 in the longitudinal direction. The feeding hopper 171 is connected to the portion of the feeding housing 173 which is positioned at the right side of the third support 121. A right end of the feeding housing 173 in the longitudinal direction may be provided with a driving member 178 to rotate the screw conveyor 177. A left end of the feeding housing 173 in the longitudinal direction supports the screw conveyor 177 in a rotatable manner. A discharge hole 174 is formed below the portion of the feeding housing 173 which is positioned between the inner surface of the first cylindrical portion 1511 and the outer surface of the second cylindrical portion 1553.

When the object to be extracted is fed into the feeding hopper 171 while the driving unit 178 is operating, the object dropped to the feeding housing 173 through the feeding hopper 171 is transferred to the left side in the longitudinal direction by the screw conveyor 177 which is rotated in the feeding housing 173. Then, the object is dropped between the inner surface of the first cylindrical portion 1511 and the outer surface of the second cylindrical portion 1553 through the discharge hole 174 formed in the feeding housing 173, and the dropped object is guided to the narrow portion between the first cylindrical portion 1511 and the second cylindrical portion 1553, as illustrated in FIG. 5, so that the object is pressed and extracted between the inner surface of the first cylindrical portion 1511 and the outer surface of the second cylindrical portion 1553.

As illustrated in FIG. 5, in the case where the second extractor 155 is eccentric in a downward direction, the object to be extracted is pressed and extracted as it moves downwardly, and is pressed to the max at a center of the load. As the object passes the center of the load, the pressing force is gradually decreased.

The first cylindrical portion 1511 provided in the first extractor 151 is formed with a plurality of through-holes 1512, as illustrated in FIGS. 3 and 4. The inner surface of the first cylindrical portion 1511 may be provided with a screen 153 having a plurality of fine holes. A size of the fine hole is determined so that the juice is discharged while the pulp is not discharged.

The juice pressed and extracted between the first cylindrical portion 1511 and the second cylindrical portion 1553 is discharged through the fine holes and the through-holes 1512 formed in the first cylindrical portion 1511, and a part of the pulp or the whole pulp is attached to the inside of the screen 153 and rotated together. A detaching member 189 for detaching the pulp from the inside of the first cylindrical portion is positioned in an outside of the cylindrical portion 1511, and is spaced apart from the first cylindrical portion. The detaching member 189 injects a fluid in an inward direction from the outside of the first cylindrical portion 1511. The detaching member 189 is a spray nozzle, for example, and connected to a cooler (not illustrated) of an air conditioner to inject the cold fluid (e.g., air) to the first cylindrical portion 1511. The detaching member 189 may be a spray nozzle extending in the longitudinal direction of the first cylindrical portion 1511, and having nozzle holes. By injecting the cold fluid, it is possible to suppress components of the juice extractor 100 from being oxidized.

The juice extracted from the object to be extracted flows downwardly through the first cylindrical portion 1511, and then is collected in a collection unit (not illustrated) by a collecting and guiding unit 157 provided below the first cylindrical portion 1511. The collecting and guiding unit 157 is positioned below the first cylindrical portion 1511, and is inclined and extended in a predetermined length to guide the juice falling from the first cylindrical portion 1511. The collecting and guiding unit 157 is preferably formed to be larger than a projection area of the first cylindrical portion 1511.

The discharge unit 180 has a discharge housing member positioned between the inner surface of the first cylindrical portion 1511 and the outer surface of the second cylindrical portion 1553 and extending outwardly in the longitudinal direction, a discharge guide portion 189 communicating with the discharge housing member and extending downwardly, and a screw conveyor 187 rotatably installed in the discharge housing. The discharge housing member has a discharge housing 183 positioned between the inner surface of the first cylindrical portion 1511 and the outer surface of the second cylindrical portion 1553 and having an arc-shaped cross section, and a first discharge housing 185 extending outwardly from the discharge housing 183 in the longitudinal direction of the first cylindrical portion 1511. The discharge housing 183 and the first discharge housing 185 communicate with each other. The discharge guide portion 189 is extended downwardly from the first discharge housing 185.

An inner end of the screw conveyor 188 is rotatably supported by the discharge housing 183, and an outer end is rotatably supported by the first discharge housing 185. The discharge housing 183 has a cylindrical housing support 1831, and the inner end of the screw conveyor 188 is rotatably inserted in an inner end of the housing support.

A right end of the first discharge housing 185 in the longitudinal direction has a driving member 188 for rotating the screw conveyor 188, and the screw conveyors 178 and 188 are connected to and operated by the motor 141. The discharge housing 183 is positioned below the detaching member 189 for injecting the fluid, and has a concave portion towards the detaching member 189. The first discharge housing 185 may be made of a hollow pipe, and be formed in an arc shape.

The discharge unit 180 is installed to be eccentric to a direction opposite to a rotating direction of the first extractor 151 and the second extractor 155, as illustrated in FIG. 5.

The pulp attached to the inner surface of the first cylindrical portion 1511 and rotated together with it is detached from the first cylindrical portion 1511 by the fluid injected from the detaching member 189, and then drops toward the discharge housing 183 of the discharge housing member, and then is transferred outwardly by the screw conveyor 187 rotating in the discharge housing 183, when seen from the longitudinal direction. Then, the pulp is discharged downwardly through the discharge guide portion 189 connected to the first discharge housing 185.

The juice extractor 100 of the related art has a complicated configuration. Also, since the support shaft of the first cylindrical portion 1511 is made of a hollow body, a bearing having a large diameter should be provided, and a recovery of the juice is not easily.

In order to make the circumferential speed of the first extractor 151 and the second extractor 155 equal, it is difficult to adjust the gear ratio of the first to fourth gears 1471 to 1477.

DISCLOSURE

Technical Problem

Accordingly, the present invention has been made in view of the above problems, and it is an object of the present invention to provide a high-capacity juice extractor having a simple configuration that can easily adjust a gear ratio to adjust a circumferential speed of a first extractor and a second extractor, and prevent the juice, which is extracted from the pressed object to be extracted, from flowing along a second shaft.

Technical Solution

To accomplish the above object, there is provided a high-capacity juice extractor including: a base; first and second supports which are spaced apart from each other in a longitudinal direction, and are provided on the base; a first extracting member which is a hollow cylinder opened toward the second support, is positioned between the first support and the second support, is rotatably supported on the first support by an outer casing support shaft, and is formed with a plurality of outlet ports; a second extracting member which is rotatably supported on the second support by an inner casing support shaft which is eccentric to the outer casing support shaft, and is positioned in the first extracting member to be eccentric to the first extracting member; and a driving member configured to drive at least one of the first extracting member and the second extracting member, the first extracting member having an outer casing gear, the second extracting member having an inner casing gear which is meshed with the outer casing gear, and the first extracting member and the second extracting member are rotated by gear engagement of the outer casing gear and the inner casing gear.

A high-capacity juice extractor includes: a base; first and second supports which are spaced apart from each other in a longitudinal direction, and are provided on the base; a first extracting member which is a hollow cylinder opened toward the second support, is positioned between the first support and the second support), is rotatably supported on the first support by an outer casing support shaft, and is formed with a plurality of outlet ports; a second extracting member which is rotatably supported on the second support by an inner casing support shaft which is eccentric to the outer casing support shaft, and is positioned in the first extracting member to be eccentric to the first extracting member; and a driving member configured to drive at least one of the first extracting member and the second extracting member, the first extracting member and the second extracting member having a portion with an increased cross-sectional area at the same position in the longitudinal direction.

The first extracting member includes an outer casing gear, the second extracting member includes an inner casing gear which is meshed with the outer casing gear, and the first extracting member and the second extracting member are rotated by gear engagement of the outer casing gear and the inner casing gear.

Lines extending from the inner casing support shaft and the outer casing support shaft are parallel to each other.

The high-capacity juice extractor according to claim 1 or 3, wherein an opened end of the first extracting member is provided with an annular member which is made of a semicircular plate to expose an inner upper portion of the first extracting member, and the annular member has a first annular member, two second annular members and a third annular member. The first annular member is positioned at an outside of the outer casing gear and the inner casing gear. The third annular member is spaced apart from the first annular member, is positioned in an inside in the longitudinal direction, and is positioned in a side of the outer casing gear and the inner casing gear, and an annular portion of the third annular member coincides with an inner diameter of the outer casing. The second annular members are interposed between the first annular member and the third annular member, in which the inner casing gear is interposed between the second annular members, and an annular portion of the second annular member coincides with an inner diameter of the first extracting member.

The annular portion of the first annular member coincides with an outer diameter of the opened end of the first extracting member, an upper portion of the first annular member is formed with an outer groove, an arc-shaped convex portion is formed on a center of the outer groove, and a circumference of the center of the outer groove is equal to or higher than an addendum circle of the inner casing gear.

An upper portion of the third annular member is formed with a first inner groove, an arc-shaped convex portion is formed on a center of the first inner groove, and a circumference of the center of the first inner groove is equal to or higher than an addendum circle of the inner casing gear. A center of the third annular member is formed with a second inner groove which coincides with an outer diameter of the second extracting member and is opened downwardly.

A thickness of the second annular member is thicker than that of the inner casing gear of the second extracting member.

An end of the second extracting member which faces the other side of the opened end, that is, a bottom surface, of the first extracting member is provided with a protrusion protruding towards the bottom surface of the first extracting member.

The first extracting member and the second extracting member have a center portion of a cross-sectional area larger than that of both ends.

The cross-sectional area of the first extracting member and the second extracting member is gradually increased from both ends to the center.

[Advantageous Effects]

With the above configuration according to the high-capacity juice extractor, the configuration is simple, the number of gears required for rotating the first extracting member and the second extracting member is decreased, so that a gear ratio can be easily adjusted to control a circumferential speed of the first extractor and the second extractor. Also, it is possible to prevent the juice, which is extracted from the pressed object to be extracted, from flowing along the second shaft.

DESCRIPTION OF DRAWINGS

FIG. 1 is a perspective view illustrating an extractor according to the related art.

FIG. 2 is a cross-sectional view schematically illustrating the extractor according to the related art.

FIGS. 3 and 4 are perspective views schematically illustrating the configuration of the extractor according to the related art.

FIG. 5 is a cross-sectional view taken along the line A-A in FIG. 2.

FIG. 6 is a cross-sectional view of a portion of the feeding unit which is provided in the extractor according to the related art.

FIG. 7 is a perspective view schematically illustrating a portion of the discharge unit which is provided in the extractor according to the related art.

FIG. 8 is a cross-sectional view of a portion of the discharge unit in FIG. 7.

FIG. 9 is a cross-sectional view schematically illustrating a high-capacity juice extractor according to one embodiment of the present invention.

FIG. 10 is a perspective view illustrating portions of extracting members of the high-capacity juice extractor according to the embodiment of the present invention.

FIG. 11 is a cross-sectional view illustrating the extracting members of the high-capacity juice extractor according to the embodiment of the present invention.

FIG. 12 is a cross-sectional view illustrating a first extracting member of the high-capacity juice extractor according to the embodiment of the present invention.

FIG. 13 is a cross-sectional view illustrating a second extracting member of the high-capacity juice extractor according to the embodiment of the present invention.

FIGS. 14 to 16 are views schematically illustrating an engaged relationship of the extractors in the high-capacity juice extractor according to the embodiment of the present invention.

FIG. 17 is a cross-sectional illustrating extracting members of the high-capacity juice extractor according to modified example of the present invention.

MODE FOR INVENTION

Hereinafter, a high-capacity juice extractor according to one embodiment of the present invention will be described in detail with reference to the attached drawings.

FIG. 9 is a cross-sectional view schematically illustrating a high-capacity juice extractor according to one embodiment of the present invention. FIG. 10 is a perspective view illustrating portions of extracting members of the high-capacity juice extractor according to the embodiment of the present invention. FIG. 11 is a cross-sectional view illustrating the extracting members of the high-capacity juice extractor according to the embodiment of the present invention. FIG. 12 is a cross-sectional view illustrating a first extracting member of the high-capacity juice extractor according to the embodiment of the present invention. FIG. 13 is a cross-sectional view illustrating a second extracting member of the high-capacity juice extractor according to the embodiment of the present invention. FIGS. 14 to 16 are views schematically illustrating an engaged relationship of the extractors in the high-capacity juice extractor according to the embodiment of the present invention. FIG. 17 is a cross-sectional illustrating extracting members of the high-capacity juice extractor according to modified example of the present invention.

With reference to the drawing figures, the term “longitudinal direction” is used to generally describe a direction from a front toward a rear of the juice extractor, and “inward direction” or “inwardly” is used to generally describe a direction from the front towards an inside of a first extracting member, while “outward direction” or “outwardly” is used to generally described a direction opposite to the inwardly direction or the inward“.

As illustrated in FIG. 9, a high-capacity juice extractor 200 according to one embodiment of the present invention includes a base 210, a support member, a first extracting member 270, a second extracting member 290, a feeding unit 220, a discharge unit (not illustrated), a driving member 240, a collecting container, and a housing 280 for housing parts of the above components therein.

The base 210 serves as a support frame of the juice extractor 200 according to this embodiment. The base 210 is provided on an upper portion thereof with the support member, a motor M, and the collecting container. One side of the housing is opened, and the collecting container 260 can pass through the opening of the housing 280.

The support member has a first support 230 and a second support 250. The first and second supports are spaced apart from each other in a longitudinal direction, and are fixed to a top surface of the base. Specifically, the first support 230 is provided at one side of the base in the longitudinal direction, and the second support 250 is provided at the other side.

The first support 230 has a plurality of plates connected to each other. The first support 230 is formed with a through-hole in the longitudinal direction, and rotatably supports an outer casing support shaft 276 of the first extracting member 270 via a bearing.

The second support 250 has a plurality of plates connected to each other. The driving member 240 is provided between the plates of the second support 250.

An upper portion of the second support 250 is formed with a through-hole in the longitudinal direction, and rotatably supports an inner casing support shaft 295 of the second extracting member 250 via a bearing. The second support 250 has at least one support roller 251. The support roller 251 is rotatably supported by the second support 250 via the bearing. The support roller 251 is provided below the opening of the first extracting member 270. The support roller 251 is brought into contact with the first extracting member 270 in a circumferential direction thereof to support the first extracting member 270.

The first support 230 and the second support 250 may be made of one plate.

As illustrated in FIGS. 9 to 12, the first extracting member 270 is a hollow cylinder which is opened toward the second support 250. The first extracting member 270 is positioned between the first support 230 and the second support 250. The first extracting member 270 is rotatably supported by the outer casing support shaft 276 via the bearing.

The first extracting member 270 has an outer casing 271, an inner sieve 279, the outer casing support shaft 276, a support shaft stiffener 278, and an outer casing gear 277.

The outer casing 271 is a hollow cylinder which is opened toward the second support 250. The outer casing 271 is formed with a plurality of outlet ports 273. The outlet ports 273 are spaced apart from each other in the longitudinal and circumferential direction. The opened end of the outer casing 271 is provided with an outer casing flange 275 which extends outwardly from an end of the outer casing 271 in a radial direction. The outer casing flange 275 is formed with a plurality of holes in the longitudinal direction, and the outer casing gear 277 is fixed to the outer casing flange. A plurality of holes are formed in the longitudinal direction through the outer casing gear 277 and are spaced apart from each other in the circumferential direction, and the outer casing gear 277 is engaged to the outer casing flange by fastening bolts to the holes.

The inner sieve 279 is provided to the inner surface of the outer casing 271. The inner sieve 279 is fixed to the inner surface of the outer casing 271 and is rotated together with the outer casing 271. The inner sieve 279 is a sieve provided with a plurality of fine holes. A size of the fine formed in the inner sieve 279 is smaller than that of the outlet ports 273. The juice is discharged through the fine holes, and the pulp exists in the inner sieve 279.

The outer casing support shaft 276 is formed in the shape of a bar extending in the longitudinal direction. One end of the outer casing support shaft 276 is fixed to an outer surface of the other side, i.e., a bottom portion, of the outer casing 271. The outer casing support shaft 276 is rotatably supported by the first support 230 via the bearing. The outer casing support shaft 276 is connected to a center portion of the outer casing 271, which becomes a center of rotation.

The support shaft stiffener 278 is made of an annular plate. The center of the support shaft stiffener 278 is positioned to coincide with the outer casing support shaft 276. The support shaft stiffener 278 is fixed to the outer surface of the bottom portion of the outer casing 271 by a screw. The outer casing support shaft 276 penetrates the center of the support shaft stiffener 278. The outer casing support shaft 276 penetrating the support shaft stiffener 278 is welded to the support shaft stiffener 278.

The outer casing gear 277 is formed in an annular shape. The outer casing gear 277 is provided with a gear on an inner peripheral surface thereof. The outer casing gear 277 is fixed to the outer casing flange 275. As illustrated in FIGS. 11 and 14, a diameter D11 of an addendum circle of the outer casing gear 277 is identical to an inner diameter D1 of the outer casing 271. The reference numeral D13 in FIG. 14 is a diameter of a dedendum circle of the outer casing gear 277. The outer casing gear 277 is meshed with the inner casing gear 293 of the second extracting member 290 which is inscribed and meshed with the outer casing gear 277.

As illustrated in FIGS. 9 to 11 and 13, the second extracting member 290 is a cylinder extending in the longitudinal direction. The second extracting member 290 is provided in the first extracting member 270. The second extracting member 290 is rotatably supported by the inner casing support shaft 295 which is supported by the second support 250 via the bearing. The second extracting member 290 is provided in the first extracting member 270 in the state in which the second extracting member is eccentric to the first extracting member 270 by the inner casing support shaft 295 which is eccentric to the outer casing support shaft 276.

The second extracting member 290 has an inner casing 291, the inner casing support shaft 295, the inner casing gear 293 and an annular member.

The inner casing 291 is made of a cylinder extending in the longitudinal direction. The inner casing 291 is a hollow body, and is opened toward the second support 250. The inner casing 291 is provided in the outer casing 271. An outer diameter D2 of the inner casing 291 is smaller than the inner diameter D1 of the outer casing 271. The center of the inner casing 291 is downwardly eccentric to the center of the outer casing 271.

The inner casing 291 is provided with a hollow protrusion 2911 having a circular cross section which protrudes from an outer surface of the opposite side, i.e., a bottom portion, of the opened portion of the inner casing toward the bottom surface of the outer casing 271. The protrusion 2911 is brought into contact with the inner bottom surface of the outer casing 271, or a small gap is formed between an end of the protrusion 2911 and the inner bottom surface. Due to formation of the protrusion 2911, the bottom surface of the inner casing 291 does not come into contact with the bottom surface of the outer casing 271. When the inner casing 291 is inserted in the outer casing 271, the protrusion 2911 guides an insertion depth of the inner casing 291 so that the inner casing gear 293 is directly meshed with the outer casing gear 277. The center of the bottom portion of the inner casing 291 is formed with an insertion hole 2913 extending in the longitudinal direction. The rotational shaft, i.e., the inner casing support shaft 295, of the inner casing 291 is inserted in the insertion hole 2913.

The inner casing support shaft 295 is formed in the shape of a bar extending in the longitudinal direction. The left end of the inner casing support shaft 295 in the longitudinal direction is formed with an inserting portion 2953 having a stepped portion. The inserting portion 2953 penetrates the insertion hole 2913 formed in the bottom portion of the inner casing 291. The inserting portion may be provided with a threaded portion. The inserting portion 2953 of the inner casing support shaft 295 is fixed to the outer surface of the bottom portion of the inner casing 291 by a fixing member 2951. The fixing member 2951 includes a nut or the like. The inner casing support shaft 295 is fixed to the bottom portion of the inner casing 291, and extends through the opening of the inner casing 291. The other side of the inner casing support shaft 295 is rotatably provided to the second support 250 via the bearing. The inner casing support shaft 295 is a center shaft of the inner casing which becomes a center of rotation. The inner casing support shaft 295 is eccentric to the outer casing support shaft 276. The inner casing support shaft 295 and the outer casing support shaft 276 are provided in such a way that lines extending from the inner casing support shaft 295 and the outer casing support shaft 276 are parallel to each other.

The inner casing gear 293 is made of an annular plate. The inner casing gear 293 is provided with a gear on an outer circumference thereof. The inner casing gear 293 is fixed to the opened end of the inner casing 291. The inner casing gear 293 is inscribed and meshed with the outer casing gear 277. The reference numeral D21 in FIG. 15 is a diameter of an addendum circle of the inner casing gear 293, and D23 is a diameter of a dedendum circle of the inner casing gear 293.

The first extracting member 270 and the second extracting member 290 are inscribed with the addendum circle D21 of the inner casing gear 293 and the dedendum circle D13 of the outer casing gear 277, and the dedendum circle D23 of the inner casing gear 293 is inscribed and meshed with the addendum circle D11 of the outer casing gear 277.

As illustrated in FIG. 10, the annular member is provided to the opened ends of the first and second extracting members 270 and 290. The annular member is made of a semicircular plate so that the upper portion of the first extracting member 270 is exposed. The annular member has a first annular member 297, two second annular members 292 and a third annular member 299 which are arranged in order from a right side to a left side in the longitudinal direction and are brought into contact with each other. The second annular members 292 are interposed between the first annular member 297 and the third annular member 299.

As illustrated in FIG. 14, the first annular member 297 is made of a semicircular plate, and is interposed between the outer casing gear 277 and the second support 250. The first annular member 297 is brought into contact with the outer surface of the outer casing gear 277 in the longitudinal direction. The first annular member 297 is fixed to the second support 250. An annular portion of the first annular member 297 coincides with an outer diameter of the outer casing gear 277, and is positioned at the lower portion.

An upper portion of the first annular member 297 is formed with an outer groove 2975. An arc-shaped convex portion is formed on a center of the outer groove 2975. A circumference of the center of the outer groove 2975 is equal to or higher than the addendum circle D21 of the inner casing gear 293.

The first annular member 297 is formed with a shaft hole 2971 extending in the longitudinal direction. The shaft hole 2971 is formed at a position which is the center of rotation of the inner casing 291. The inner casing support shaft 295 penetrates the shaft hole 2971.

The third annular member 299 is spaced apart from the first annular member 297, and is positioned in the inside in the longitudinal direction. The third annular member 299 is a substantially semicircular plate. The third annular member 299 is positioned in the inside of the outer casing gear 277 and the inner casing gear 293. As illustrated in FIG. 16, an annular portion of the third annular member 299 coincides with an inner diameter D1 of the outer casing 271.

An upper portion of the third annular member 299 is formed with a first inner groove 2993. An arc-shaped convex portion is formed on a center of the first inner groove 2993. A circumference of the center of the first inner groove 2993 is equal to or higher than the addendum circle D21 of the inner casing gear 293.

A center of the third annular member 299 is formed with a second inner groove 2995. The second inner groove 2995 coincides with the outer diameter D23 of the inner casing 291. The second inner groove 2995 is opened downwardly. Lower ends of the third annular member 299 are spaced apart from each other by the second inner groove 2995.

As illustrated in FIG. 15, two second annular members 292 are provided in this embodiment, and are made of plates. The second annular members 292 are interposed between the first annular member 297 and the third annular member 299. The second annular members 292 are brought into contact with the first annular member 297 and the third annular member 299. The inner casing gear 293 is interposed between the second annular members 292.

The second annular member 292 has an arc-shaped portion at one side. The arc-shaped portion of the second annular member 292 is formed to coincide with the inner diameter D1 of the outer casing 271 (the inner diameter D1 of the outer casing is identical to the addendum circle D11 of the outer casing gear 277). The opposite ends of the second annular member 292 are formed to coincide with the addendum circle D21 of the inner casing gear 293. The second annular member 292 has a thickness thicker than that of the inner casing gear 293.

The arc-shaped portions of the second and third annular members 292 and 299 coincide with the inner diameter D1 of the outer casing 271, and serve as a guide when the first extracting member 270 is assembled.

The first annular member 297, the second annular members 292 and the third annular member 299 are formed with a plurality of engaging holes 2973, 2921 and 2991 extending in the longitudinal direction, and are engaged to each other by inserting an engaging member in the engaging holes.

The feeding unit 220 and the discharge unit (not illustrated) are substantially equal to those of the related art, and thus will be described in detail.

The driving member 240 is provided below the second support 250, and is connected to the inner casing support shaft 295 of the second extracting member 290. The driving member 240 has the motor M, a pulley and a belt. The motor M is positioned below the inner casing support shaft 295. The motor M and the inner casing support shaft 295 are provided with the pulleys, and the belt is wound around the pulleys.

The driving member 240 provides a rotating force to the first extracting member 270 and the second extracting member 290, and rotates the inner casing support shaft 295 of the second extracting member 290. The inner casing support shaft 295 is rotated by the driving member 240, so that the first extracting member 270 and the second extracting member 290 are rotated to extract the juice.

The collecting container 260 is provided on the base 210, and is positioned below the first extracting member 270. The collecting container 260 has a hollow body opened upwardly. The collecting container 260 has a size equal to or larger than the longitudinal length of the first extracting member 270.

Now, a juice extractor 200 according to a modified example of the present invention will be described.

As illustrated in FIG. 17, a first extracting member 270 and a second extracting member 290 are formed in such a way that a cross-sectional area is increased in the longitudinal direction at the same position. Specifically, the cross-sectional area of the first and second extracting members 270 and 290 are larger than that of both ends. In other words, the first and second extracting members 270 and 290 may be formed so that the cross-sectional area is gradually increased from both ends to the center. According to the juice extractor 200 according to the modified example, the juice is extracted from the object, and then is collected and discharged in a direction A in which the cross-sectional area is increased.

The first extracting member 270 is provided with a discharge screw for discharging the pulp in an inner upper portion of the first extracting member. The discharge screw may be made of a flexible material (e.g., rubber).

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

With the high-capacity juice extractor according to the present invention, the configuration is simple, the number of gears required for rotating the first extracting member and the second extracting member is decreased, so that the gear ratio can be easily adjusted to control a circumferential speed of the first extractor and the second extractor. Also, it is possible to prevent the juice, which is extracted from the pressed object to be extracted, from flowing along the second shaft.

The invention claimed is:

1. A high-capacity juice extractor comprising:

a base (210);

first and second supports (230 and 250) which are spaced apart from each other in a longitudinal direction, and are provided on the base (210);

a first extracting member (270) which is a hollow cylinder opened toward the second support (250), is positioned between the first support (230) and the second support (250), is rotatably supported on the first support (230) by an outer casing support shaft (276), and is formed with a plurality of outlet ports (273);

a second extracting member (290) which is rotatably supported on the second support (250) by an inner casing support shaft (295) which is eccentric to the outer casing support shaft (276), and is positioned in the first extracting member (270) to be eccentric to the first extracting member; and a driving member (240) configured to drive at least one of the first extracting member (250) and the second extracting member (290), the first extracting member (270) including an outer casing gear (277), the second extracting member (299) including an inner casing gear (293) which is meshed with the outer casing gear (277), and the first extracting member (270) and the second extracting member (290) are rotated by gear engagement of the outer casing gear (277) and the inner casing gear (293), wherein an opened end of the first extracting member (270) is provided with an annular member which is made of a semicircular plate to expose an inner upper portion of the first extracting member (270), and the annular member has a first annular member (297), two second annular members (292) and a third annular member (299);

the first annular member (297) is positioned at an outside of the outer casing gear (277) and the inner casing gear (293);

the third annular member (299) is spaced apart from the first annular member (297), is positioned in an inside in the longitudinal direction, and is positioned in a side of the outer casing gear (277) and the inner casing gear (293), and an annular portion of the third annular member (299) coincides with an inner diameter of the outer casing (271); and the second annular members (292) are interposed between the first annular member (297) and the third annular member (299), in which the inner casing gear (293) is interposed between the second annular members, and an annular portion of the second annular member (292) coincides with an inner diameter of the first extracting member (270).

2. The high-capacity juice extractor according to claim 1, wherein lines extending from the inner casing support shaft (295) and the outer casing support shaft (276) are parallel to each other.

3. The high-capacity juice extractor according to claim wherein the annular portion of the first annular member (297) coincides with an outer diameter of the opened end of the first extracting member (270), an upper portion of the first annular member (297) is formed with an outer groove (2975), an arc-shaped convex portion is formed on a center of the outer groove (2975), and a circumference of the center of the outer groove (2975) is equal to or higher than an addendum circle (D21) of the inner casing gear (293).

4. The high-capacity juice extractor according to claim 1, wherein an upper portion of the third annular member (299) is formed with a first inner groove (2993), an arc-shaped convex portion is formed on a center of the first inner groove (2993), and a circumference of the center of the first inner groove (2993) is equal to or higher than an addendum circle (D21) of the inner casing gear (293); and a center of the third annular member (299) is formed with a second inner groove (2995) which coincides with an outer diameter (D23) of the second extracting member (290) and is opened downwardly.

5. The high-capacity juice extractor according to claim wherein a thickness of the second annular member (292) is thicker than that of the inner casing gear (293) of the second extracting member (290).

6. The high-capacity juice extractor according to claim 1, wherein an end of the second extracting member (290) which faces the other side of the opened end, that is, a bottom surface, of the first extracting member (270) is provided with a protrusion (2911) protruding towards the bottom surface of the first extracting member (270).

7. A high-capacity juice extractor comprising:

a base (210);

first and second supports (230 and 250) which are spaced apart from each other in a longitudinal direction, and are provided on the base (210);

a first extracting member (270) which is a hollow cylinder opened toward the second support (250), is positioned between the first support (230) and the second support (250), is rotatably supported on the first support (230) by an outer casing support shaft (276), and is formed with a plurality of outlet ports (273);

a second extracting member (290) which is rotatably supported on the second support (250) by an inner casing support shaft (295) which is eccentric to the outer casing support shaft (276), and is positioned in the first extracting member (270) to be eccentric to the first extracting member; and a driving member (240) configured to drive at least one of the first extracting member (250) and the second extracting member (290), the first extracting member (270) and the second extracting member (290) having a portion with an increased cross-sectional area at the same position in the longitudinal direction, wherein the first extracting member (270) and the second extracting member (290) have a center portion of a cross-sectional area larger than that of both ends.

8. The high-capacity juice extractor according to claim 7, wherein the cross-sectional area of the first extracting member (270) and the second extracting member (290) is gradually increased from both ends to the center.

9. The high-capacity juice extractor according to claim 7, wherein an end of the second extracting member (290) which faces the other side of the opened end, that is, a bottom surface, of the first extracting member (270) is provided with a protrusion (2911) protruding towards the bottom surface of the first extracting member (270).

10. A high-capacity juice extractor comprising:

a base (210);

first and second supports (230 and 250) which are spaced apart from each other in a longitudinal direction, and are provided on the base (210);

a first extracting member (270) which is a hollow cylinder opened toward the second support (250), is positioned between the first support (230) and the second support (250), is rotatably supported on the first support (230) by an outer casing support shaft (276), and is formed with a plurality of outlet ports (273);

a second extracting member (290) which is rotatably supported on the second support (250) by an inner casing support shaft (295) which is eccentric to the outer casing support shaft (276), and is positioned in the first extracting member (270) to be eccentric to the first extracting member; and a driving member (240) configured to drive at least one of the first extracting member (250) and the second extracting member (290), the first extracting member (270) and the second extracting member (290) having a portion with an increased cross-sectional area at the same position in the longitudinal direction, wherein the first extracting member (270) includes an outer casing gear (277), the second extracting member (299) includes an inner casing gear (293) which is meshed with the outer casing gear (277), and the first extracting member (270) and the second extracting member (290) are rotated by gear engagement of the outer casing gear (277) and the inner casing gear (293), wherein an opened end of the first extracting member (270) is provided with an annular member which is made of a semicircular plate to expose an inner upper portion of the first extracting member (270), and the annular member has a first annular member (297), two second annular members (292) and a third annular member (299);

the first annular member (297) is positioned at an outside of the outer casing gear (277) and the inner casing gear (293);

the third annular member (299) is spaced apart from the first annular member (297), is positioned in an inside in the longitudinal direction, and is positioned in a side of the outer casing gear (277) and the inner casing gear (293), and an annular portion of the third annular member (299) coincides with an inner diameter of the outer casing (271); and the second annular members (292) are interposed between the first annular member (297) and the third annular member (299), in which the inner casing gear (293) is interposed between the second annular members, and an annular portion of the second annular member (292) coincides with an inner diameter of the first extracting member (270).

11. The high-capacity juice extractor according to claim 10, wherein the annular portion of the first annular member (297) coincides with an outer diameter of the opened end of the first extracting member (270), an upper portion of the first annular member (297) is formed with an outer groove (2975), an arc-shaped convex portion is formed on a center of the outer groove (2975), and a circumference of the center of the outer groove (2975) is equal to or higher than an addendum circle (D21) of the inner casing gear (293).

12. The high-capacity juice extractor according to claim 10, wherein an upper portion of the third annular member (299) is formed with a first inner groove (2993), an arc-shaped convex portion is formed on a center of the first inner groove (2993), and a circumference of the center of the first inner groove (2993) is equal to or higher than an addendum circle (D21) of the inner casing gear (293); and a center of the third annular member (299) is formed with a second inner groove (2995) which coincides with an outer diameter (D23) of the second extracting member (290) and is opened downwardly.

13. The high-capacity juice extractor according to claim 10, wherein a thickness of the second annular member (292) is thicker than that of the inner casing gear (293) of the second extracting member (290).

* * * * *